(12) United States Patent
Bachmann

(10) Patent No.: US 8,814,148 B2
(45) Date of Patent: Aug. 26, 2014

(54) LIQUID DISTRIBUTOR

(75) Inventor: Christian Gottlieb Bachmann, Ellikon An Der Thur (CH)

(73) Assignee: Sulzer Chemtech AG, Winterthur (CH)

( * ) Notice: Subject to any disclaimer, the term of this patent is extended or adjusted under 35 U.S.C. 154(b) by 195 days.

(21) Appl. No.: 12/660,983

(22) Filed: Mar. 9, 2010

(65) Prior Publication Data

US 2010/0237518 A1 Sep. 23, 2010

(30) Foreign Application Priority Data

Mar. 23, 2009 (EP) .................................... 09155852

(51) Int. Cl.
*B01F 3/04* (2006.01)
*B01D 3/00* (2006.01)
*B01D 3/20* (2006.01)
*B01D 53/18* (2006.01)

(52) U.S. Cl.
CPC ........ *B01D 3/008* (2013.01); *B01D 3/20* (2013.01); *B01D 53/185* (2013.01)
USPC ............................................ 261/97; 261/110

(58) Field of Classification Search
CPC ........... B01D 3/008; B01D 3/185; B01D 3/20
USPC ................................................... 261/97, 110
See application file for complete search history.

(56) References Cited

U.S. PATENT DOCUMENTS

| | | | | |
|---|---|---|---|---|
| 4,846,266 | A * | 7/1989 | Acker et al. ................... | 165/115 |
| 5,061,407 | A | 10/1991 | Nutter | |
| 5,776,316 | A * | 7/1998 | Potthoff et al. ............... | 202/158 |
| 6,395,139 | B1 * | 5/2002 | Potthoff ........................ | 202/262 |
| 6,527,258 | B2 * | 3/2003 | Bartlok ........................... | 261/97 |
| 6,758,463 | B2 * | 7/2004 | Zone et al. ..................... | 261/97 |
| 7,896,039 | B2 * | 3/2011 | Bachmann et al. ........... | 141/286 |
| 2002/0079597 | A1 | 6/2002 | Bartlok | |
| 2003/0094709 | A1 * | 5/2003 | Zone et al. ..................... | 261/97 |

FOREIGN PATENT DOCUMENTS

| | | |
|---|---|---|
| EP | 1 316 345 A | 6/2003 |
| WO | WO2007/033960 | 3/2002 |

* cited by examiner

*Primary Examiner* — Charles Bushey
(74) *Attorney, Agent, or Firm* — Francis C. Hand; Carella, Byrne, et al

(57) ABSTRACT

The liquid distributor includes a channel for the reception of a liquid which is divided by a dividing wall into a first chamber and a second chamber. An inlet element for a liquid opens into the first chamber to fill the first chamber with the liquid. Openings are provided in the dividing wall so that the liquid can be distributed from the first chamber via the openings into the second chamber in the form of jets to create turbulent vortices.

17 Claims, 5 Drawing Sheets

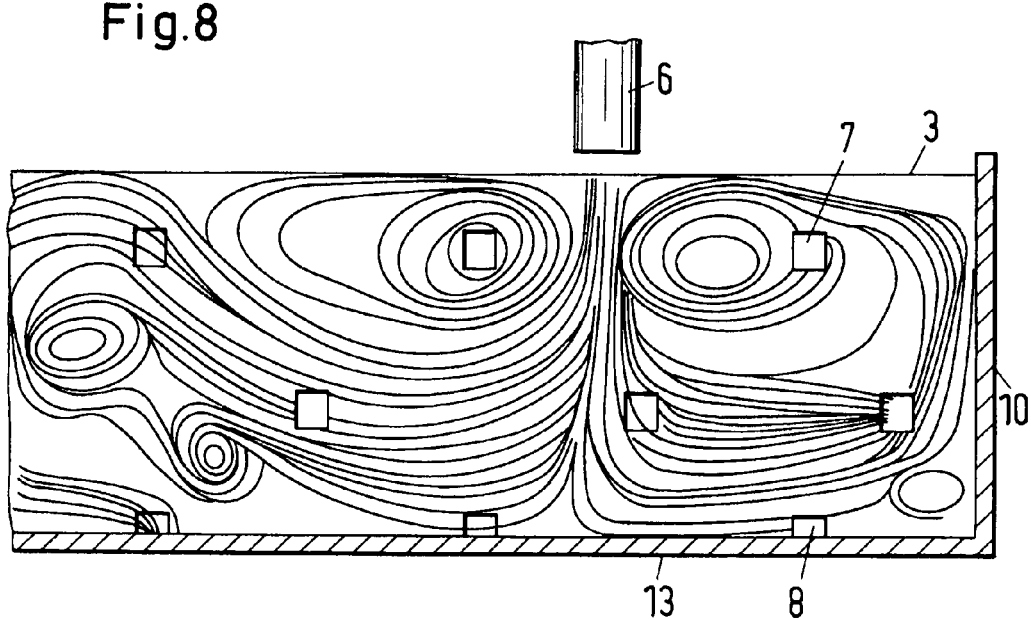
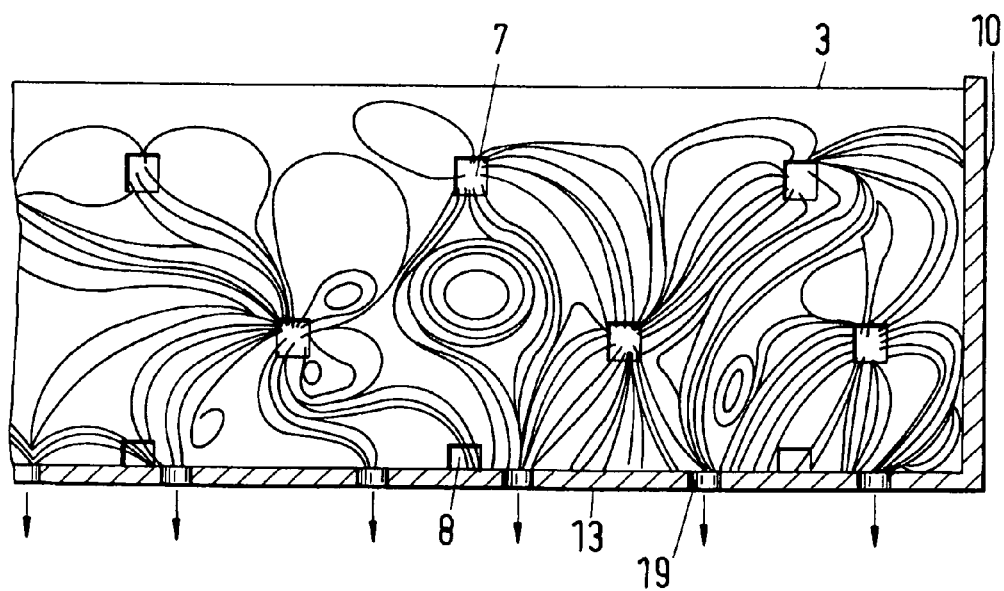

LIQUID DISTRIBUTOR

This invention relates to a liquid distributor for a separation column, in particular for polymerizing liquids, for example for a rectification, an absorption or another thermal separation process.

As is known, separation columns can be made as tray columns or as packed columns. Packed columns can contain bulk filled bodies or structured packings at which a mass transfer between a liquid and a gas takes place. A liquid distributor is a channel which is supplied with liquid from an inlet pipe and which has a plurality of openings through which the liquid is discharged into a separation column.

A liquid distributor in accordance with the prior art, such as is shown in FIG. 1, has dead zones in which the liquid de facto stagnates, thus its flow velocity tends toward zero. This results in a wide distribution of the flow velocity in the liquid distributor. The discharge openings which are furthest away from the inlet pipe are located in such a dead zone.

A further known liquid distributor contains a further pre-distributor channel, such as shown in FIG. 2, in the interior of the channel. This pre-distributor channel serves for the pre-distribution of the liquid in the liquid distributor. Differences in the flow velocities are partly compensated by this liquid distributor. The flow velocity of the liquid also decreases as the distance from the inlet pipe increases in this case. The formation of a dead zone is therefore to be expected in both cases and indeed in the channel in accordance with FIG. 1 or in the pre-distributor channel in accordance with FIG. 2. Such a pre-distributor channel is, for example, also disclosed in U.S. Pat. No. 5,061,407. The liquid which runs out of the pre-distributor channel is kept in motion. However, the liquid level is always different depending on the throughput. As the liquid level increases, the liquid in the channel is set in motion with less intensity because the falling distance of the liquid is reduced and the liquid penetrates less far into the retained liquid. Thus, only an upper region of the lower channel is set into strong motion, but not the zone close to the base; and a dead zone can, in turn, form close to the base.

WO2007/033960 shows an arrangement of a liquid distributor for two immiscible liquids. In order to mix these two liquids, dead zones have to be avoided, such that a segregation of the liquids is avoided. However, the approach chosen in WO2007/033960 is to discharge the immiscible phases separately from the distributor arrangement. Each of the phases leaves the chambers separately via tubes arranged in a separating wall, which are provided with openings. If any dead zones exist locally in each of the phases, this is not disadvantageous due to the fact that the phases due to their spatial separation can not enter any reaction. For this reason, this solution is not suitable for discharging a polymerizing liquid which does not consist of two immiscible phases, but forms a single phase in which a polymerization reaction is initiated within a certain time period.

A spontaneous polymerization reaction can occur in dead zones for a polymerizing liquid due to the long dwell time, which results in solidification of the liquid and can cause a clogging of the openings present in the region of the dead zone. It is generally assumed for polymerizing fluids that the dwell time should be kept as low as possible to avoid clogging of distributors by polymerization, that is the operating volume of the distributor should be kept as small as possible.

US2002/0079597 shows a distributor in FIG. 7 with a vertical separating wall. Tubes are provided for the discharge of liquid similar to WO2007/033960. According to US2002/0079597, the stationary hold up is to be decreased to decrease the number of distributor stages and the horizontal liquid transport is to be decreased. From these result smaller channel widths and consequently smaller liquid flow rates. This solution does also not provide any indication if and how dead zones could be avoided.

Accordingly, it is the object of the invention to eliminate dead zones in liquid distributors in separation columns.

It is another object of the invention to provide an improvement for a liquid distributor for a separation column with which dead zones can be avoided, particularly when the dwell time cannot be reduced or even when the average dwell time is increased in comparison with the prior art.

Briefly, the invention provides a liquid distributor comprised of a channel having a base for the reception of a liquid and a dividing wall extending longitudinally within the channel to divide the channel into two chambers. In addition, an inlet element for a liquid is provided that opens into a first of the chambers for filling the chamber with liquid, a plurality of openings is provided in the dividing wall to communicate the two chambers for distributing liquid from one chamber into the other chamber and a plurality of discharge openings is provided in the base in the region of the second chamber for the discharge of liquid.

The two chambers are arranged next to each other and the dividing wall extends in the longitudinal direction of the channel. A direction is understood as the longitudinal direction which substantially corresponds to the largest dimension of the channel. The channel is open as a rule and has a channel width, a channel height and a channel length. In a three-dimensional orthogonal coordinate system, the channel length extends substantially in the x direction, the channel width extends substantially in the y direction and the channel height extends substantially in the z direction. The channel width and the channel height are smaller than the channel length.

Despite a higher average dwell time in the distributor in accordance with the invention, it was found that it is less prone to polymerization if care is taken that the liquid is kept in motion.

No dead zones thus in particular arise at the ends of the channels which are located in the region of the front wall and of the rear wall in the proximity of the base of the channel. The ends of the channels have the maximum distance from the inlet element so that a flow movement which is caused by the liquid entering through the inlet element into the first chamber is no longer effective at the ends. The openings are therefore arranged such that a backflow arises, that is, in contrast to the prior art, the liquid remains in motion.

The total cross-sectional surface area of the openings in the dividing wall is at most 30% of the total cross-sectional area of the dividing wall. Preferably, the cross-sectional surface area of the openings is at most 10%, particularly preferred at most 5%. Herewith, the flow is promoted in particular in zones in proximity to the walls without interfering with the main flow. Consequently, an essentially undisturbed discharge of the liquid is ensured through the discharge openings arranged in the base of the channel of the second chamber. Thereby, the liquid can be kept in movement by the small but even flow velocity through the openings in areas in proximity to the walls. Consequently a stagnation of the liquid and the resulting consequence of initiation of a polymerization can be avoided.

It is in addition particularly advantageous that the liquid movement is ensured independently of the filling level of the chambers due to the fact that the first chamber is arranged next to the second chamber. It is achieved by the dividing wall with the openings provided herein that no dead zones can form close to the base. This effect occurs independently of whether the chamber is filled completely with liquid, that is up to the chamber height, or is only filled with liquid up to a fraction of the chamber height.

It results as an advantage from this that it is ensured that no dead zones form independently of the load of the liquid distributor with liquid. This means that the dead zones in the liquid distributor in accordance with the invention can be avoided both under part load and under full load.

The dividing wall advantageously includes a vertical section. If the openings are present in the vertical section, the liquid flows through these openings at a flow velocity which has a horizontal component. The flow which has passed through an opening is thus incident onto the side wall of the second chamber. The flow is deflected by the side wall of the channel. The liquid flow is hereby also kept in motion in regions close to the wall so that a formation of dead zones in the proximity of the side wall is avoided. This impact of the flow on the side wall of the channel is promoted in that the spacing between the dividing wall and the side wall, that is the chamber, width, is smaller than the calming section of the liquid flow. Calming section should here be understood as the path a liquid particle covers until the direction of movement imposed by the inlet pulse at the opening no longer differs from the mean statistical movement of the liquid particle in a liquid volume.

The dividing wall can in particular be arranged parallel to a side wall of the channel. The width of the first or second chambers is hereby the same over the total channel length. Similar flow conditions can thus be created over the total channel length. The local dwell time of the liquid is thus substantially the same at every location of the first or second chambers.

The flow velocity of the liquid drops in regions of the channel further remote from the inlet element. In this case, the channel width can reduce as the distance from the inlet element increases, that is the channel can converge. The channel thus has its smallest channel width at the front wall or at the rear wall. A sufficiently high flow velocity can hereby be maintained in the channel.

The total channel width is set such that a given distribution quality is achieved with a minimized retention volume. The width of the second chamber has to be dimensioned such that a maximum activity of the liquid is reached. The channel width in particular amounts to at least 30 mm for installation reasons, but should be kept as small as possible.

The channel has a channel height which is selected such that the channel can receive the total liquid to be distributed over the cross-section surface of the separation column by means of the distributor apparatus at a maximum load of the separation column and can distribute it over a distributor apparatus, a mass transfer tray or a packing layer disposed thereunder. If the distributor apparatus contains a plurality of channels, the same applies accordingly to the sum of the channels. The first chamber has a first chamber height and the second chamber has a second chamber height, with the first chamber height and the second chamber height amounting to more than half the channel height, preferably more than 75% of the channel height.

The first chamber height is in particular substantially the same as the second chamber height. The liquid passes simultaneously from the first chamber into the second chamber at a plurality of points which are distributed evenly over the surface of the dividing wall. The liquid is thus in motion over the total channel height.

The channel of the liquid distributor has a channel length, with the length of the first chamber substantially corresponding to the channel length. It is hereby ensured that the liquid enters into the second chamber over the openings in the dividing wall along the total channel length. Dead zones can be avoided along the total channel length.

The channel of the liquid distributor has a base, with the base being aligned substantially horizontally so that a liquid has a different liquid level, measured from the base of the channel, along the channel length in the first chamber. It is hereby ensured that the flow relationships result in a downward flow gradient in the total liquid distributor, but it is simultaneously avoided that the liquid flows unevenly through the discharge openings. The hydrostatic pressure tends to be balanced at each point of the base of the channel so that the discharge velocity of the liquid through the discharge openings is the same. The liquid quantity which flows through each of the discharge openings is thus substantially the same, assuming discharge openings of the same design. The liquid can accordingly be distributed evenly over the distributor apparatus arranged in the separation column. The total cross-sectional surface of the separation column is thus available for mass transfer when the distributor liquid is distributed over the total cross-sectional surface. This can have positive effects both with respect to the efficiency and with respect to the capacity of the separation column. The openings in the dividing wall are in particular dimensioned such that a downward gradient is maintained between the first chamber and the second chamber. The liquid level is therefore preferably higher in the first chamber than in the second chamber. The liquid flow is opposed by a defined resistance by means of the openings, with a flow velocity being maintained in the second chamber by said resistance.

The channel of the liquid distributor has a channel width, with the first chamber having a chamber width which is determined by the spacing between the dividing wall and the side wall of the channel and the chamber width of the first chamber being smaller than the channel width. Because the dividing wall is arranged substantially vertically, the penetration depth of the liquid into the volume enclosed by the second chamber corresponds to the chamber width of the second chamber. The liquid passes through the openings into the second chamber. The liquid forms jets in this process. The jets are discharged from the opening into the second chamber and penetrate into the volume enclosed by the first chamber which has a small spacing from the side wall. The spacing corresponds to the chamber width of the second chamber. It is thus ensured that the jets set the whole chamber width into motion. This is not possible at all throughputs with the two-channel system in accordance with the prior art, that is, with a pre-distributor channel which is installed in a channel, in particular, being suspended in the channel.

The level of the liquid, that is the level of the liquid present in the channel causes different flow behavior because the liquid level increases with the square of the throughput and the flow velocity in the channel thus falls before it is discharged through the openings at the base of the channel. At a low liquid level, the liquid is admittedly discharged directly through the openings, but the discharge takes place unevenly due to the differences in the flow velocities between a region of the channel beneath the inlet element and a region of the channel in the vicinity of its front wall or rear wall.

A high liquid level can also be disadvantageous for another reason. The liquid entering into the channel through the openings of the pre-distributor channel is not able to set the whole volume in the chamber into motion, in particular not the liquid in the region close to the base if the liquid level corresponds to the spacing between the base of the channel and the base of the pre-distributor channel.

At least some of the openings in the dividing wall can be arranged in a row. Turbulent vortices are caused by the openings in the dividing wall. Simulations have shown that the vortex centers do not remain stationary at one location. The flow is in the turbulent region, that is, the flow is characterized by velocity components which are locally highly non-stationary or fluctuating. No high local dwell time is thus built up despite vortex centers. The flow averaged over time is shown in CFD simulations. Numerous small vortices are formed by a high number of openings. The vortex centers of the small vortices averaged over time have a smaller local dwell time than the rather more stationary, large-area vortices such as occur in the prior art.

The openings in the dividing wall can be arranged offset with respect to one another. If the openings are offset with respect to one another, the advantage in particular results that some of the openings can be used for deaeration. Deaeration in this respect means the discharge of gas from the second chamber.

The openings can be made as slits in the dividing wall. The dividing wall is normally not connected to the side wall of the channel along the whole chamber length. A narrow gap is normally present at the upper end between the dividing wall and the side wall so that the gas can escape via this gap. If this gap is not sufficient, the openings can in particular be made as slits to ensure the deaeration.

The dividing wall can contain openings which are adjacent to the base of the channel. It is ensured in this respect that liquid cannot collect at the base of the channel.

The base and/or the side wall of the channel contain at least one discharge opening for the discharge of the liquid in the region of the second chamber. If a plurality of discharge openings is foreseen, they enable a direct and even discharge of the liquid onto a mass transfer element, such as a packing, disposed beneath the base element. The base element can be arranged in a separation column and a liquid distributor is arranged on it for the liquid distribution in accordance with any one of the preceding embodiments.

Alternatively to this, provision can also be made for each of the embodiments that the liquid being discharged from the liquid distributor is fed into a fine distributor. An even distribution of the liquid is only achieved by this fine distributor via a mass transfer element connected downstream, that is arranged spatially beneath the base element. Each of these fine distributors only contains a small quantity of liquid which is moreover in permanent motion. Any rest zones in the fine distributor can therefore be left out of consideration because they are of a negligible time duration in comparison with the dead zones.

The liquid distributor in accordance with any one of the preceding embodiments is particularly advantageously used for polymerizing liquids or for suspensions or emulsions which should not segregate.

The invention will be explained in the following with reference to the drawings wherein:

FIG. 8 illustrates a representation of flow lines in a part of the first chamber of an embodiment in accordance with the invention;

FIG. 9 illustrates a representation of flow lines in a part of the second chamber of an embodiment in accordance with the invention;

Figure 1:
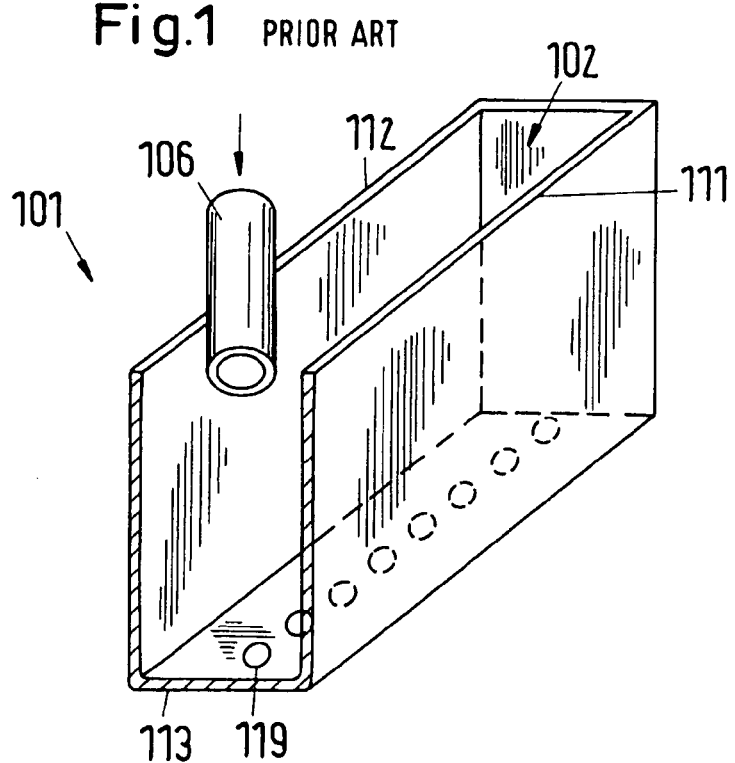
FIG. 1 illustrates a liquid distributor in accordance, with a first embodiment from the prior art.

Referring to FIG. 1, a known liquid distributor 101 includes a channel 102 for the reception of a liquid and an inlet element 106 by means of which liquid can be introduced into the channel projects into the channel 102. The liquid collects in the channel 102 before leaving the liquid distributor. For this purpose, discharge openings 119 are made at the base 113 of the channel 102. There are dead zones in the liquid volume present in the channel 102 in which the liquid stagnates de facto, that is, the liquid is at rest. Due to the dead zones, there is a wide distribution of the flow velocity in the liquid distributor, that is there are locations at which the flow velocity tends toward zero and other locations at which the flow velocity does not substantially differ from the flow velocity in the inlet element. The discharge openings which are furthest away from the inlet element 106 are located in such a dead zone. A dead zone can also arise at the side walls 111, 112 of the channel due to the wall flow.

Figure 2:
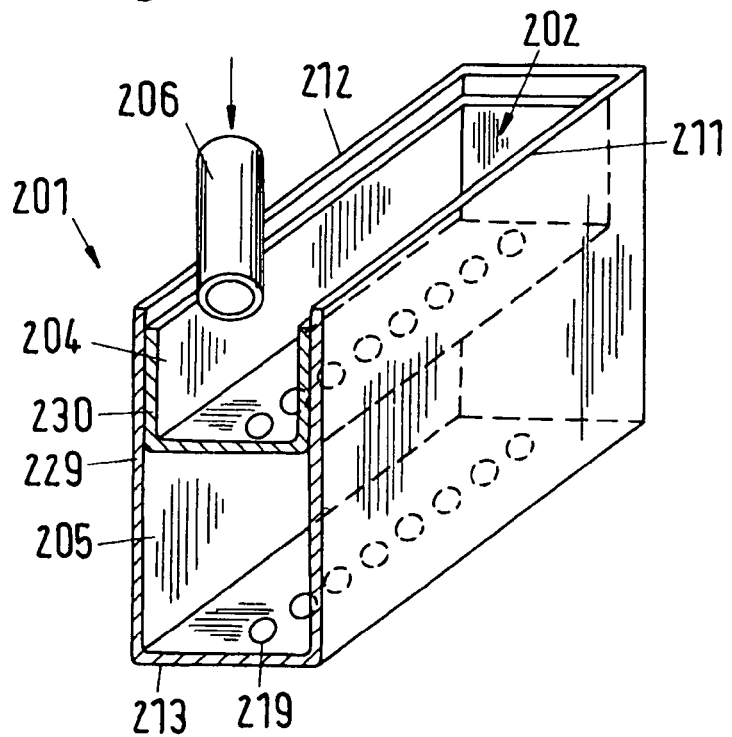
FIG. 2 illustrates a liquid distributor in accordance with a second embodiment from the prior art.

Referring to FIG. 2, another known liquid distributor 201 includes a channel 202 for the reception of a liquid and contains a further channel, the so-called pre-distributor channel 230. The pre-distributor channel 230 forms an upper chamber 204 which is arranged in the interior of the channel 202. The base of the upper chamber 204 serves as a boundary to a lower chamber 205. The upper and lower chambers thus form a two-channel system. In this two-channel system, it is not possible that the liquid remains in motion in the lower chamber 205 at all throughputs. If the head from the upper chamber 204 into the lower chamber 205 is small, the liquid which forms the surface is admittedly in motion. However, the movement is not transmitted to lower layers, in particular layers which are disposed in the vicinity of the base 213 of the channel.

The higher the level of the liquid rises in the lower chamber 205, the lower the head of the liquid becomes which falls through the discharge openings 229 to the liquid volume present in the lower chamber. Accordingly, the velocity at the location of impact with the liquid surface is reduced. If the level of the liquid in the lower chamber 205 almost reaches the base of the upper chamber 204, this liquid movement becomes negligible. This means that the liquid is in a state of rest which is present up to directly before the discharge through the discharge openings 219. Dead zones therefore form in this case, in particular in the vicinity of the side walls 211, 212. The dwell time in which dead zones result in deposits can vary depending on the liquid. Polymerization is started in zones where portions of the liquid can no longer be moved, in particular when the dwell time is longer than 60 seconds.

When the polymerization has started, the deposits also grow in the direction of the openings. Polymerization can also be found at the edges between the side wall and the channel base. From there, the deposition can grow in all directions, often also in the direction of the openings which can ultimately clog up.

Figure 3:
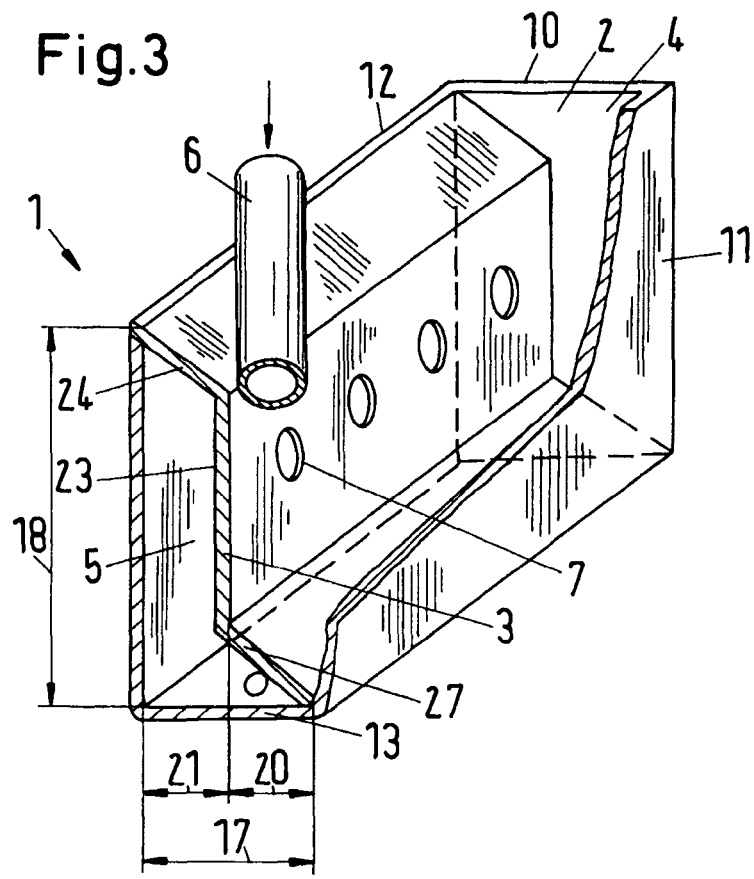
FIG. 3 illustrates a section through a first embodiment of the liquid distributor in accordance with the invention.

Referring to FIG. 3, the liquid distributor 1 includes a channel 2 for the reception of a liquid. The channel 2 is divided into a first chamber 4 and into a second chamber 5 by a dividing wall 3 with the chambers 4, 5 being disposed in side-by-side relation to each other. An inlet element 6 for a liquid, for example, an inlet pipe, opens into the first chamber 4 so that the first chamber 4 can be filled with the liquid.

The first chamber is connected to the second chamber via openings 7 which are made in the dividing wall 3 so that the liquid can be distributed from the first chamber 4 via the openings 7 into the second chamber 5, with the first chamber 4 being arranged next to the second chamber 5. More than two chambers can naturally also be arranged next to one another, which can in particular be advantageous with a channel 2 with a large channel width 17. The chamber width 21 should in every case be kept so small that the liquid remains in motion through the openings 7 into the second chamber 5 and/or into optionally present further chambers along the total chamber width 21. The liquid which is incident onto the side wall 12 which is disposed substantially opposite the openings 7 is thus deflected along the side wall 12. This means that the liquid also remains in motion in the vicinity of the side wall 12, whereby dead zones can be prevented.

Each of the two chambers has a chamber height 14, 15, which substantially corresponds to the channel height in the embodiments in accordance with FIGS. 3 to 9, and a chamber length 22 which substantially corresponds to the channel length 16. The chamber width 20, 21 is determined by the spacing between the dividing wall 3 and the side wall 11, 12 of the channel 2 and is smaller than the channel width 17.

Figure 4:
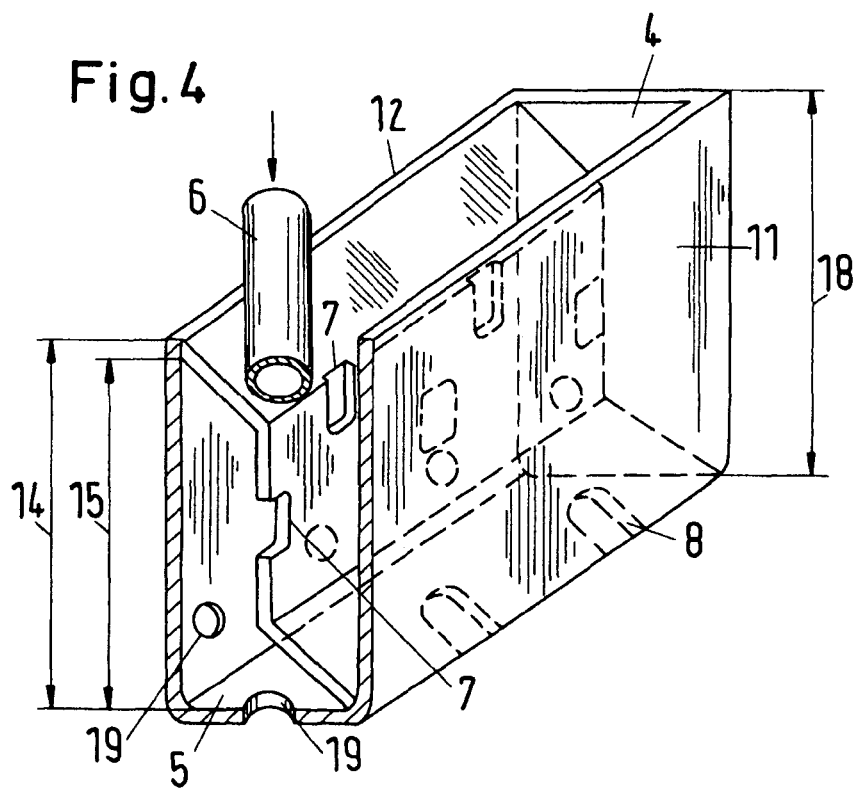
FIG. 4 illustrates a section through a second embodiment of the liquid distributor in accordance with the invention.
Figure 5:
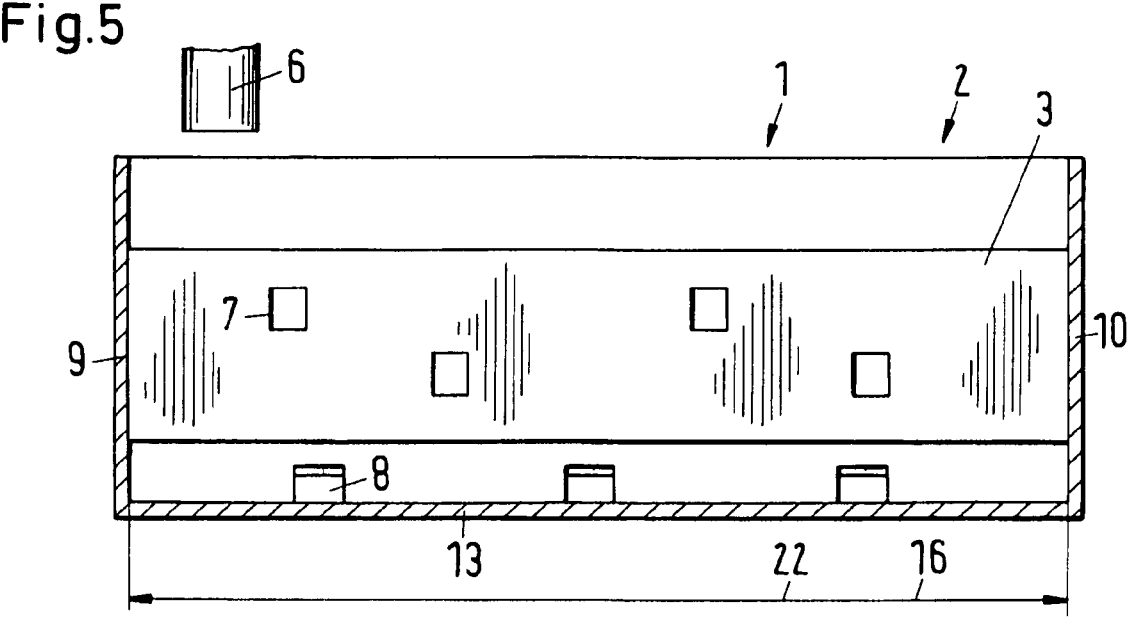
FIG. 5 illustrates a section through a liquid distributor in accordance with the second embodiment in accordance with FIG. 4.
Figure 6:
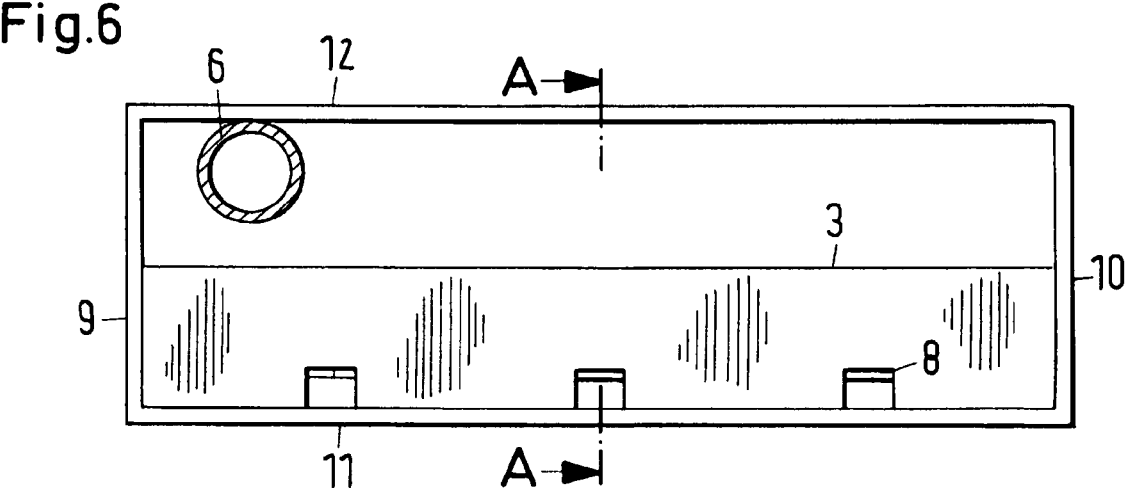
FIG. 6 illustrates a view of the liquid distributor in accordance with FIG. 5 from above.
Figure 7:
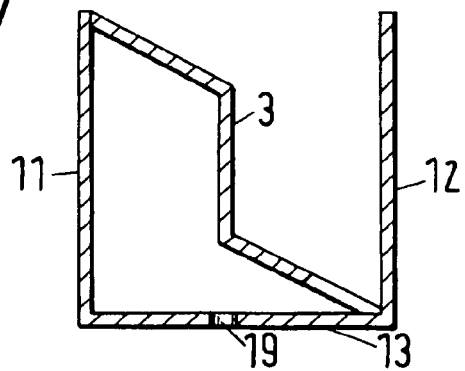
FIG. 7 illustrates a section trough the liquid distributor of FIG. 6 along the sectional plane A-A.

Referring to FIG. 4, wherein like reference characters indicate like parts as above, the distributor may also have openings 8 formed in the bottom of the dividing wall 3 adjacent to the base 5 of the channel 2, to communicate the bottom of the first chamber 4 with the bottom of the second chamber 5. It is hereby ensured that liquid cannot collect at the base 5 of the channel 2.

Simulations have shown that it is ensured by the openings 7,8 in the dividing wall 3 that the liquid remains in motion. The movement of the liquid is, in contrast to the prior art, distributed over the whole chamber length and that part of the chamber height which corresponds to the level of the liquid in the chamber.

The liquid introduced at one or more feed points into the first chamber 4 is distributed evenly over the first chamber 4. At the same time, the liquid enters in jets through the openings 7,8 in the dividing wall 3 from the first chamber 4 into the second chamber 5. The first and the second chambers are arranged next to one another; the penetration depth of the liquid into the volume enclosed by the second chamber thus corresponds to the chamber width 21 of the second chamber 5.

It is important that the jets from the first chamber 4 penetrate into the volume enclosed by the second chamber 5. The liquid remains in motion until reaching the side wall 12 if the dividing wall 3 has a small spacing from the side wall 12. The spacing corresponds to the chamber width 21 of the second chamber 5. It is hereby ensured that the jets set the liquid into motion over the whole chamber width 21.

Turbulent vortices are formed by the openings 7,8 in the dividing wall. When such vortices are formed, dead zones can, in principle, likewise arise in their environment, in particular when these vortices are located in a stationary manner at the same location. Simulations have shown that the vortex centers are not stationary at one location in an arrangement in accordance with FIG. 3 or FIG. 4. The flow is turbulent, i.e. locally highly non-stationary and fluctuating. No long local dwell time is thus built up despite the vortex centers. The flow averaged over time is shown in CFD (computational fluid dynamics) simulations, which is reproduced with reference to FIG. 8 and FIG. 9. If a plurality of openings 7, 8 is provided, numerous small vortices are formed. The vortex centers of the small vortices averaged over time have a smaller local dwell time than the rather more stationary, large-area vortices such as occur in the prior art in the environment of the discharge openings. It follows from this that the flow is kept in motion by the movement of the vortex centers themselves and no dead zone occurs at a larger distance of the stationary vortex as in the prior art.

Figure 10:
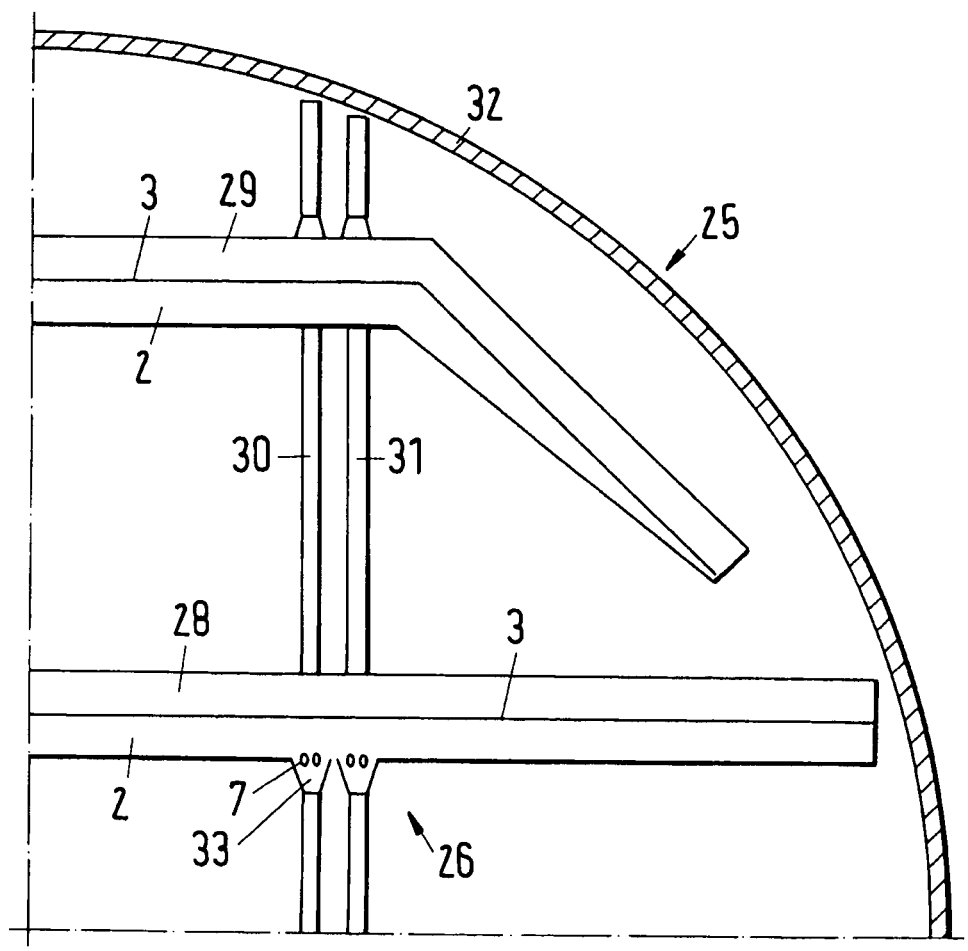
FIG. 10 illustrates a representation of a part of a column base with different constructions of liquid distributors in accordance with the invention.

The dividing wall 3 advantageously includes at least one vertical section. The dividing wall in accordance with FIGS. 8-10 is vertical in its totality. The advantages of the solution in accordance with the invention can also be shown with a vertical dividing wall, which is illustrated in FIG. 8 and FIG. 9. A dividing wall with a vertical section 23 is shown in FIG. 3 and FIG. 4. This solution is particularly advantageous since the total channel width 17 is available for the inlet element 6. The liquid can thus be introduced over the total channel width, which simplifies the fixing of the position of the inlet element 6 relative to the channel 2. Above all with liquid distributors which have a channel length of a plurality of meters, the observation of tight tolerances is complex and/or expensive in narrow chambers. If the inlet element 6 is namely in operation in a slightly offset position with respect to the channel, a portion of the liquid can flow past outside the channel and is accordingly not taken up by the liquid distributor.

Referring to FIGS. 3 and 4, the vertical section 23 of the dividing wall 3 is advantageously connected at the upper end to an inclined section 24, that is, a section arranged at an angle to the vertical. This section 24 is supported at the side wall 12. The first chamber 4 hereby converges, that is, the chamber width reduces until the vertical section 23 is reached. A further advantage of this arrangement is caused by the fact that the dividing wall 3 can be held in a shape-stable position in the channel.

For this purpose, the dividing wall 3 can have a further inclined section 27 which adjoins the bottom of the vertical section 23 and which is supported in the edge formed by the side wall 11 and the base 5.

If the openings 7, 8 are present in the vertical section 23, the liquid flows through these openings at a flow velocity which has a horizontal component. The flow which has passed through an opening is thus incident onto the side wall 12 of the second chamber 5. The flow is deflected at the side wall 12 of the chamber 5. The liquid flow is hereby also kept in motion in regions close to the wall so that a formation of dead zones in the marginal region is avoided.

The dividing wall 3 can in particular be arranged parallel to a side wall 11, 12 of the channel. The width of the first or second chambers is hereby the same over the total channel length. Similar flow conditions can thus be, created over the total channel length. The mean dwell time of the liquid is thus the same at every position of the first or second chambers and the maximum dwell time is so low that no dead zones form.

The channel 2 has a channel height 18 which is selected such that the channel can receive the total liquid to be distributed via the base element 26 of the separation column 25 at a maximum load of the separation column and can distribute it to a base element or a packing layer disposed thereunder. If a plurality of channels 2 is present on the base element, the same applies accordingly to the sum of the channels. The channel height 18 has to be selected the bigger, the more the load of the separation column can fluctuate. Fluctuations in the quantity of liquid in the operating range of the separation column can be compensated by the liquid distributor.

The liquid entering through the inlet element 6 is distributed to the first chamber 4 in the channel. The first chamber 4 has a first chamber height 14 and the second chamber 5 has a second chamber height 15, with the first chamber height 14 and the second chamber height 15 amounting to more than half the channel height 18, preferably to more than 75% of the channel height 18. If one of the first or second chamber heights were selected to be lower, undesired spillover of the liquid over the upper edge of the dividing wall 3 could occur on the selection of an upwardly open chamber such as shown in FIGS. 8 to 10 or both chambers could be flooded if the base element 26 has too high a load of liquid. In this case, the advantage of a sequential course of the flow from the first chamber 11 through the openings in the dividing wall 3 into the second chamber 12 would be negated again.

The first chamber height 14 is in particular substantially the same as the second chamber height 15. In accordance with this preferred variant, the channel height 18 is utilized completely for the generation of a movement in the liquid to be distributed. The liquid passes simultaneously from the first chamber 4 into the second chamber 5 through the openings which are distributed evenly over the surface of the dividing wall 3. The liquid is thus in motion over the total channel height 18.

The channel 2 of the liquid distributor 1 has a channel length 16, with the chamber length 22 of the first chamber 4 and the chamber length of the second chamber 5 substantially corresponding to the channel length. The channel length 16 extends from the inner surface of the front wall 9 to the inner surface of the rear wall 10. It is hereby ensured that the liquid moves along the total channel length 22 via the openings 8, 9 in the dividing wall 3 from the first chamber 4 into the second chamber 5. Dead zones can be avoided along the total channel length, since the vortex centers of the arising small vortices averaged over time can result in a shorter dwell time than the rather stationary, large-area vortices such as arise in solutions in accordance with FIG. 1 or FIG. 2.

The channel 2 of the liquid distributor has a base 13, with the base 13 being aligned horizontally so that a liquid present in the first chamber has substantially the same liquid level along the channel length 16, measured from the base 13 of the channel. It is hereby ensured that the flow relationships are the same in the total liquid distributor. At the same time, it is avoided that the liquid flows unevenly through the discharge openings 19. The hydrostatic pressure is the same at each point of the base 13 of the channel so that the discharge speed of the liquid through the discharge openings 19 is the same. The quantity of liquid which flows through each of the discharge openings 19 is substantially the same. Consequently, the liquid can be evenly distributed over the base element 26 of the separation column 25. The total cross-sectional surface of the separation column is thus available for the mass transfer. This can have positive effects both with respect to the efficiency and with respect to the capacity of the separation column.

The channel 2 of the liquid distributor has a channel width 17, with the first chamber 4 having a chamber width 20 which is determined by the spacing between the dividing wall 3 and the side wall 11 of the channel and the chamber width 20 of the first chamber 4 being smaller than the channel width 17. Because the dividing wall 3 is preferably arranged substantially vertically or at least includes a vertical section 23, the penetration depth of the liquid into the volume enclosed by the second chamber 5 corresponds to the chamber width 21 of the second chamber 5. The liquid passes through the openings 7, 8 into the second chamber. The liquid forms jets in this process. The jets are discharged from the opening 7, 8 into the second chamber 5 and penetrate into the volume enclosed by the second chamber 5. The dividing wall 3 has a small spacing from the side wall 12. The spacing corresponds to the chamber width 21 of the second chamber 5. It is thus ensured that the jets set the flow into motion along the total chamber width 21, with the advantageous effects described above.

The openings 7, 8 in the dividing wall 3 can be arranged offset with respect to one another and can be formed as slits in the dividing wall 3.

The base 13 and/or the side wall 12 of the channel 2 contain(s) openings 19 in the region of the second chamber 5 for the discharge of the liquid. The openings 19 enable a direct and even discharge of the liquid onto a mass transfer element, such as a packing, disposed beneath the base element 26.

The base element 26 is advantageously arranged in a separation column 25. Such a separation column can be used for a mass transfer, for example for an absorption or distillation column. A liquid distributor for liquid distribution in accordance with any one of the preceding embodiments is used to pre-distribute the liquid moving from an inflow or a collector to the inlet element and coming from the inlet element 6 into the channel 2 to fine distributors. The liquid pre-distributed to the fine distributors by means of the liquid distributor is distributed by the fine distributors as a film or as droplets onto a mass transfer element, such as a packing, disposed beneath these fine distributors.

The liquid distributor in accordance with any one of the preceding embodiments is advantageously used for polymerizing liquids. When a polymerizing liquid is used, it results as an additional advantage that a polymerization can be effectively prevented because the liquid remains in motion until it exits the distributor through the openings.

A distribution apparatus 26 in accordance with FIG. 10 contains a first main channel 28, a second main channel 29 as well as branch channels 30, 31 disposed thereunder. Only a part of the distribution apparatus 26 is shown. The distribution arrangement 26 is arranged in a separation column. A sector of the column wall 32 is likewise shown in section. The direction of view in FIG. 10 is from above, that is in the main flow direction of the liquid through the separation column. The liquid is introduced via openings 7 made at the first main channel 28 into the branch channel. A guide member 33 such as is disclosed in EP 1 260 257 B1 can be used for this purpose. The branch channels 30, 31 can also project out of the main channel 28, 29 at the side. Branch channels 30, 31 distribute the liquid to a mass transfer element, in particular a packing, arranged beneath the distribution apparatus 26. A pre-distribution channel can be arranged in each of the first or second main channels 28, 29. The pre-distribution channel can easily be removed from the main channel. Instead of the pre-distribution channel, a liquid distributor such as shown in connection with FIG. 3 to FIG. 9 can be used.

Both the main channel 28, 29 and the branch channel 30, 31 can contain a liquid distributor 1 in accordance with any one of the preceding embodiments in the main channel 28, 29 and/or in the branch channel 30, 31. A channel 2 which is divided in the longitudinal direction by a dividing wall 3 is shown schematically in the first and second main channels 28, 29.

Two main channels 28, 29 are shown in the representation in accordance with FIG. 10. One of them converges, which is advantageous when the liquid speed would otherwise decrease too much. Only two branch channels 30, 31 are shown; however, any desired number can be provided to distribute the liquid evenly from the main channel or channels over the mass transfer element arranged beneath the distribution apparatus 1.

What is claimed is:

1. A liquid distributor comprising
a channel having a base and pair of parallel side walls extending from said base for the reception of liquid,
a dividing wall extending longitudinally within said channel to divide said channel into a first chamber and into a second chamber disposed in side-by-side relation to each other, said dividing wall having a plurality of openings therein communicating said first chamber with said second chamber and being spaced above and from said base for distributing liquid in the form of jets from said first chamber into said second chamber and to create turbulent vortices of liquid therein, the cross-sectional area of said openings in said dividing wall being at most 30% of the total cross-sectional area of said dividing wall;
an inlet element for a liquid opening into the first chamber for filling said first chamber with liquid, and
a plurality of discharge openings in said base in the region of said second chamber for the discharge of liquid.

2. A liquid distributor in accordance with claim 1 wherein the cross-sectional area of said openings in said dividing wall is at most 10% of the total cross-sectional area of said dividing wall.

3. A liquid distributor in accordance with claim 1 wherein the cross-sectional area of said openings in said dividing wall is at most 5% of the total cross-sectional area of said dividing wall.

4. A liquid distributor in accordance with claim 1 wherein said dividing wall includes at least one vertical section parallel to a respective side wall of said channel.

5. A liquid distributor in accordance with claim 1 wherein said channel has a channel predetermined channel height and wherein said first chamber has a height amounting to more than half said predetermined channel height and said second chamber has a height amounting to more than half said predetermined channel height.

6. A liquid distributor in accordance with claim 5 wherein said first chamber height is substantially the same as said second chamber height.

7. A liquid distributor in accordance with claim 1 wherein said channel has a predetermined channel height and wherein said first chamber has a height amounting to more than 75% of said predetermined channel height and said second chamber has a height amounting to more than 75% of said predetermined channel height.

8. A liquid distributor in accordance with claim 1 said first chamber extends substantially along the length of said channel.

9. A liquid distributor in accordance with claim 8 wherein said base of said channel is aligned substantially horizontally so that a liquid has a substantially equal or reducing liquid level in said first chamber along the length of said channel measured from said base with an increasing distance from said inlet element.

10. A liquid distributor in accordance with claim 1 wherein a channel between said side walls is the of a predetermined width and said first chamber has a width between said dividing wall and a respective side wall smaller than said predetermined width.

11. A liquid distributor in accordance with claim 1 wherein at least some of said openings are arranged offset to one another in a row.

12. A liquid distributor in accordance with claim 1 wherein said openings are made as slits in said dividing wall.

13. A liquid distributor in accordance with claim 1 wherein said dividing wall contains openings adjacent to said base of said channel for the passage of liquid from said first channel into said second channel.

14. A liquid distributor in accordance with claim 1 wherein one of said side walls has discharge openings communicating with said second chamber for the discharge of liquid.

15. A distributor apparatus including
a main channel,
a branch channel, and
a liquid distributor in at least one of said main channel and said branch channel, said liquid distributor including a flow channel having a base and a pair of parallel side walls extending from said base for the reception of a liquid, a dividing wall extending longitudinally within said flow channel to divide said flow channel into a first chamber and into a second chamber disposed in side-by-side relation to each other, said dividing wall having a plurality of openings therein communicating said first chamber with said second chamber and being spaced above and from said base for distributing liquid in the form of jets from said first chamber into said second chamber and to create turbulent vortices of liquid therein;
an inlet element for a liquid opening into the first chamber for filling said first chamber with liquid, and a plurality of discharge openings in said base in the region of said second chamber for the discharge of liquid.

16. A separation column including
a distributor apparatus; and
a liquid distributor on said distributor apparatus, said liquid distributor including a flow channel having a base and a pair of parallel side walls extending from said base for the reception of a liquid, a dividing wall extending longitudinally within said flow channel to divide said flow channel into a first chamber and into a second chamber disposed in side-by-side relation to each other, said dividing wall having a plurality of openings therein communicating said first chamber with said second chamber and being spaced above and from said base for distributing liquid in the form of jets from said first chamber into said second chamber and to create turbulent vortices of liquid therein; an inlet element for a liquid opening into the first chamber for filling said first chamber with liquid, and a plurality of discharge openings in said base in the region of said second chamber for the discharge of liquid.

17. A liquid distributor comprising
a channel having a base for the reception of a liquid and a predetermined channel height,
a dividing wall extending longitudinally within said channel to divide said channel into a first chamber and into a second chamber disposed in side-by-side relation to each other, said dividing wall having a plurality of openings therein communicating said first chamber with said second chamber and being spaced above and from said base for distributing liquid in the form of jets from said first chamber into said second chamber and to create turbulent vortices of liquid therein, the cross-sectional area of said openings in said dividing wall being at most 30% of the total cross-sectional area of said dividing wall;
said first chamber having a height amounting to more than half said predetermined channel height and said second chamber having a height amounting to more than half said predetermined channel height wherein said first chamber height is substantially the same as said second chamber height;

an inlet element for a liquid opening into the first chamber for filling said first chamber with liquid, and a plurality of discharge openings in said base in the region of said second chamber for the discharge of liquid.

* * * * *